US012179130B2

(12) United States Patent
Nagai et al.

(10) Patent No.: US 12,179,130 B2
(45) Date of Patent: Dec. 31, 2024

(54) LIQUID FILTER, AND A LIQUID FILTRATION APPARATUS USING THE LIQUID FILTER

(71) Applicant: Nabell Corporation, Iga (JP)

(72) Inventors: Norio Nagai, Iga (JP); Yuusuke Yagami, Iga (JP); Masayuki Maki, Iga (JP)

(73) Assignee: NABELL CORPORATION, Iga (JP)

( * ) Notice: Subject to any disclaimer, the term of this patent is extended or adjusted under 35 U.S.C. 154(b) by 453 days.

(21) Appl. No.: 17/620,986

(22) PCT Filed: Mar. 18, 2021

(86) PCT No.: PCT/JP2021/011048
§ 371 (c)(1),
(2) Date: Dec. 20, 2021

(87) PCT Pub. No.: WO2021/200205
PCT Pub. Date: Oct. 7, 2021

(65) Prior Publication Data
US 2022/0355223 A1  Nov. 10, 2022

(30) Foreign Application Priority Data

Mar. 31, 2020  (JP) ................................. 2020-061956

(51) Int. Cl.
 *B01D 29/07*  (2006.01)
 *B01D 35/30*  (2006.01)

(52) U.S. Cl.
CPC ............. *B01D 29/07* (2013.01); *B01D 35/30* (2013.01); *B01D 2201/127* (2013.01); *B01D 2201/342* (2013.01)

(58) Field of Classification Search
CPC .. B01D 29/07; B01D 35/30; B01D 2201/127; B01D 2201/342; B01D 27/06;
(Continued)

(56) References Cited

U.S. PATENT DOCUMENTS 1,211,947 A *  1/1917  Kiefer .................... A47J 43/24
                                                          210/323.1
2,587,693 A *  3/1952  Burks .................... B01D 27/06
                                                          210/493.1
(Continued)

FOREIGN PATENT DOCUMENTS

CN    112236211 A  *  1/2021  .......... B01D 29/012
CN    114007719 A     2/2022
(Continued)

OTHER PUBLICATIONS

English translation of Brown patent publication CN-112236211-A, published Jan. 15, 2021. (Year: 2021).*
(Continued)

*Primary Examiner* — Joseph W Drodge
(74) *Attorney, Agent, or Firm* — FISHERBROYLES, LLP; Roger L. Browdy; Ronni S. Jillions (57) ABSTRACT

A liquid filter and a liquid filtration apparatus are provided using the liquid filter, which enable uniform filtration over the entire range, without localizing a part where filtration occurs to the upper side above the middle. The liquid filter has a plurality of spacers fixed to a filter body. The filter body has a liquid inflow space, a plurality of diagonal fold parts individually formed outwards from corner parts of the liquid inflow space and having a length in the radial direction around the center of the liquid inflow space, and pocket parts having any one of the diagonal fold parts as one side, and individually having a triangular planar shape, and the spacers are fixed on the inner face of the filter paper, near the diagonal fold parts, and inside of the individual pocket parts.

5 Claims, 6 Drawing Sheets

(58) Field of Classification Search
CPC ............ B01D 27/08; B01D 2201/0415; B01D 2201/30; B01D 29/58; B01D 29/031; B01D 29/333; B01D 29/353; B01D 39/18; B01D 46/121; B01D 46/2403; B01D 46/62

See application file for complete search history.

(56) References Cited

U.S. PATENT DOCUMENTS

| | | | | |
|---|---|---|---|---|
| 2,747,744 | A * | 5/1956 | Gretzinger | B01D 29/15 210/488 |
| 2,980,208 | A * | 4/1961 | Neumann | B01D 46/02 210/493.5 |
| 3,961,924 | A * | 6/1976 | Alskog | B01D 46/10 55/500 |
| 4,151,095 | A * | 4/1979 | Wright | B01D 46/521 55/497 |
| 4,512,891 | A * | 4/1985 | Wright | B01D 46/10 55/497 |
| 5,128,039 | A * | 7/1992 | Gabrielson | B01D 29/111 210/450 |
| 5,505,852 | A * | 4/1996 | van Rossen | B01D 46/10 55/514 |
| 2018/0200649 | A1* | 7/2018 | Nagai | B01D 29/213 |
| 2022/0355223 | A1 | 11/2022 | Nagai et al. | |

FOREIGN PATENT DOCUMENTS

| | | |
|---|---|---|
| DE | 809795 B | 8/1951 |
| DE | 102006047030 A1 | 4/2008 |
| DE | 112017000042 T5 | 4/2018 |
| DE | 112021000035 | 2/2022 |
| GB | 678939 | 9/1952 |
| JP | 63-73114 A | 5/1988 |
| JP | 03-15611 U | 2/1991 |
| JP | 2017-202451 A | 11/2017 |
| JP | 62-79520 A | 2/2018 |
| JP | 2019-63743 A | 4/2019 |
| JP | 2021-159819 A | 10/2021 |
| TW | 201739497 A | 11/2017 |
| TW | 163777 B | 10/2018 |
| WO | 2017/195859 A1 | 11/2017 |
| WO | 2021200205 A1 | 10/2021 |

OTHER PUBLICATIONS

Microfilm of the specification and drawings annexed to the request of Japanese Utility Model Application No. 167452/1986.
Microfilm of the specification and drawings annexed to the request of Japanese Utility Model Application No. 169750/1985.

* cited by examiner

LIQUID FILTER, AND A LIQUID FILTRATION APPARATUS USING THE LIQUID FILTER

TECHNICAL FIELD

This invention relates to a liquid filter used, while housed in a filter case, for filtering off foreign matter such as sludge contained in oil or other liquid, and a liquid filtration apparatus using the liquid filter.

BACKGROUND ART

A wide variety of liquid filters have been proposed. For example, a liquid filter disclosed in JP-H02-44802 U (Patent Literature 1) has a filter paper formed into a near-rectangular shape, which is folded so that mountain fold parts and valley fold parts are alternatively and vertically arranged in sequence, and has a space into which a liquid before being filtered flows, arranged at the center.

PATENT LITERATURE

Patent Literature

[Patent Literature 1] JP-H02-44802 U

SUMMARY OF THE INVENTION

Technical Problem

The liquid filter disclosed in the aforementioned Patent Literature 1, however, often suffers from that the liquid cannot fully reach the inside of every mountain fold part that resides on the outer side of the vertical line on which the inner-positioned valley fold parts align. In a particular case where a large number of the mountain fold parts and the valley fold parts are formed, the liquid filter would have very narrow pitches between the valley fold part and the mountain fold part, on the side lower than the middle part, and would fail in uniform filtration over the entire range of the liquid filter.

This invention was proposed aiming at solving the aforementioned problem associating to the prior liquid filter and a liquid filtration apparatus that uses such liquid filter, and an object of which is to provide a novel liquid filter that enables uniform filtration over the entire range, without localizing the a part where filtration occurs to the upper side above the middle, and a liquid filtration apparatus using this liquid filter.

Solution to Problem

This invention is proposed aiming at solving the aforementioned problem, wherein a first invention (the invention described in claim 1) relates to a liquid filter that includes:
a filter body composed of a filter paper through which a liquid is allowed to pass from an inner face to an outer face, and
a plurality of spacers fixed to the filter body,
the filter body includes:
a liquid inflow space having a near-cuboidal shape formed at the center, with a near-rectangular planar shape,
mountain fold parts individually exposed to the outside of a front face and a back face, as well as of a left side face and a right side face, individually having a length in the direction orthogonal to the height direction, and juxtaposed in the height direction;
valley fold parts individually formed between the adjacent mountain fold parts, partially contributing to form the liquid inflow space, and having a length equal to or shorter than the length of the mountain fold parts;
diagonal fold parts individually formed outwards from the corner parts of the liquid inflow space, and having a length in the radial direction around the center of the liquid inflow space; and
pocket parts having any one of the diagonal fold parts as one side, and having a triangular planar shape,
each spacer being fixed on the inner face of the filter paper, near the diagonal fold part, and inside of each pocket part.

According to the liquid filter of the first invention, once the liquid to be filtered flows into the liquid inflow space, the liquid to be filtered moves from the valley fold part towards the mountain fold part, passes through the filter paper to the outside, during which any foreign matter having been contained in the liquid is trapped inside the filter paper. Now, in the liquid filter of the first invention, since each spacer is fixed on the inner face of the filter paper, near the diagonal fold part, and inside of each pocket part, so that the liquid is routed between the adjacent filter papers that are kept apart from each other by the spacer, and effectively flows into each pocket part. Hence, the filter paper of the first invention, even if strongly compressed in the height direction, can successfully avoid an event that the liquid is inhibited from flowing into the pocket and will not be filtered, and enables uniform filtration over the entire range of the filter paper. In particular, even in a case where a long filter paper is used as a material, a large number of mountain fold parts and the valley fold parts are formed in the height direction, and vertically opposing portions of the filter paper are partially pressurized with each other due to the own weight or inner pressure exerted by the liquid, it now becomes possible to certainly keep a space between the filter papers (space in the pocket parts) with the aid of the spacers, and to achieve effective and uniform filtration over the entire range of the filter paper. In other words, with the thus-structured liquid filter, the number of the mountain fold parts and the valley fold parts that are juxtaposed in the height direction may be freely determined, depending on properties of the liquid to be filtered, or an environment in which the liquid filtration apparatus, with the liquid filter housed therein, is installed.

Note that the spacer is not specifically limited regarding material, shape, length, quantity of use, number of placement, and directionality of placement of the spacer, so long as it satisfies, at least, the conditions such that each spacer is fixed on the inner face of the filter paper, near the diagonal fold part, and inside of each pocket part. For example, the spacer may be formed into a disk shape or a rectangular shape, so long as it satisfies the aforementioned conditions. In an alternative case where a plurality of spacers are fixed on the same plane near a specific diagonal fold part, each spacer may be fixed along the longitudinal direction of the diagonal fold part. Each spacer is not always necessarily fixed in parallel to the longitudinal direction of the diagonal fold part, and instead may be fixed while inclined from the longitudinal direction of the diagonal fold part, so as to make the liquid more easily guided by the spacer into the pocket part. Note that the thickness (height) of the spacer may only be large enough to allow inflow of the liquid between opposing portions of the filter paper (near an inlet of the pocket part), and may therefore only be equal to or larger than the thickness of the filter paper. On the contrary, if the thickness (height) of the spacer is large (high), it would become necessary to house the liquid filter whose numbers of mountain fold parts and valley fold parts are disadvantageously reduced in a predetermined filter case, and this would consequently prevent long-term use. The thickness (height) is therefore preferably determined by taking all of these matters into consideration. Moreover, the spacers may be arranged at the same position in a plan view (see the invention described in claim 3), or other spacers on the upper side and the lower side of a specific spacer fixed to a specific position may be fixed at positions shifted from the position where the specific spacer is fixed. For example, such other spacer to be arranged on the lower side of the specific spacer may be fixed while shifted from the position where the specific spacer is fixed, and a spacer to be fixed on the still lower side of such other spacer may be fixed at the same position where the specific spacer is fixed. In a case where the position of fixation of the spacers are thus changed among the upper side and the lower side, it now becomes possible to shorten the entire length of the liquid filter when entirely compressed.

A second invention (invention described in claim 2) relates to the first invention, but in which the plurality of spacers are individually arranged in parallel to the longitudinal direction of the diagonal fold parts, while keeping a channel space through which the liquid flows, between the spacers that are fixed on the same plane.

According to the liquid filter of the second invention, the plurality of spacers not only keep the space between the opposing portions of the filter paper (near the inlet of the pocket part) over a predetermined distance, but also allow the liquid that reaches near the inlet of the pocket part to pass through the channel space between the spacers, and to enter the pocket part. Hence, also with the liquid filter of the second invention, the space between the filter papers (space in the pocket) is certainly kept by the spacers, thereby enabling uniform filtration over the entire range of the filter paper.

A third invention (invention described in claim 3) relates to the first or second invention, but in which the left and right ends of the individual valley fold parts that are formed between the adjacent mountain fold parts that expose to the left side face or the right side face and are faced towards the liquid inflow space (these valley fold parts are referred to as "one valley fold parts", hereinafter), are spaced to each other, in a plan view of the liquid filter, from the individual valley fold parts that are formed between the adjacent mountain fold parts that expose to the front face or the back face and are faced towards the liquid inflow space, and from the individual valley fold parts that are formed between the adjacent mountain fold parts that expose to the back face and are faced towards the liquid inflow space (these valley fold parts are referred to as "the other valley fold parts", hereinafter); and each of the thus spaced one individual valley fold parts have, formed on the left and right ends thereof, an inlet port through which the liquid to be filtered enters the pocket parts.

According to the liquid filter of the third invention, first of all, the left and right ends of each of the one valley fold parts are kept apart from the other valley fold parts in a plan view of the liquid filter. At both of the left and right ends of each of the one valley fold parts, there is formed an inlet port through which the liquid to be filtered flows towards the pocket part. Since each of one valley fold parts and each of the other valley fold parts are parts that form the liquid inflow space, in a plan view of the filter body, so that each inlet port is formed so as to face the liquid inflow space.

Hence, the liquid filter of the third invention not only keeps a predetermined distance between the adjacent filter papers with the aid of the spacers, but, since the inlet port forms a part of the liquid inflow space, also promotes inflow of the liquid more effectively into each pocket part, even if the liquid filter were strongly compressed, and this successfully enables very effective filtration efficiency.

A fourth invention relates to a liquid filtration apparatus featured by having a filter case that includes a bottom plate formed into a rectangular shape; a side panel that rises up from each side of the bottom plate, and has formed therein a plurality of openings through which a liquid flows towards the outside; and a top plate having, fixed to the center thereof, a tube body through which the liquid enters, and being fixed so as to be opposed to the bottom plate; and the liquid filter described in any one of first to third inventions, housed in the filter case.

A fifth invention (invention described in claim 5) relates to the liquid filtration apparatus according to the fourth invention, but in which the top plate has a plate-like seal arranged on the lower face, and the individual spacers, being composed of an elastic material, are arranged at the same position in a plan view of the liquid filter.

According to the liquid filtration apparatus of the fifth invention, the individual spacers are arranged at the same position in a plan view of the liquid filter. Hence, by placing the liquid filter on the bottom plate, and by fixing thereto the liquid filter while pressurized with the top plate downwards opposing to the bottom plate, the individual spacers are compressed, and the top face of the liquid filter is pressed against the plate-like seal arranged on the lower face of the top plate. The liquid filtration apparatus of the fifth invention can therefore effectively prevent the liquid, coming into the filter case, from leaking to the outside through the openings of the side panels that compose the filter case, without being filtered through the liquid filter.

Advantageous Effects of Invention

The liquid filter of the first invention (invention described in claim 1) and the liquid filtration apparatus of the fourth invention (invention described in claim 4) can effectively resolve the situation that the liquid cannot flow into the pocket and cannot therefore be filtered, thereby enabling uniform filtration over the entire range of the filter paper. In particular, even in a case where a long filter paper is used as a material, a large number of mountain fold parts and the valley fold parts are formed in the height direction, and vertically opposing portions of the filter paper are partially pressurized with each other due to the own weight or inner pressure exerted by the liquid, it now becomes possible to certainly keep a space between the filter papers (space in the pocket parts) with the aid of the spacers, and to achieve effective and uniform filtration over the entire range of the filter paper.

Meanwhile, the liquid filter of the second invention (invention described in claim 2) and the liquid filtration apparatus of the fifth invention (invention described in claim 5) can certainly keep a space between the filter papers (space in the pocket parts) with the aid of the spacers, and can achieve effective and uniform filtration over the entire range of the filter paper.

Meanwhile, the liquid filter of the third invention (invention described in claim 3) and the liquid filtration apparatus of the fourth invention (invention described in claim 4) is not only able to keep a predetermined distance between the adjacent filter papers with the aid of the spacers, but, with the inlet port formed therein, also promotes inflow of the liquid more effectively into each pocket part, and this successfully enables very effective filtration efficiency.

Meanwhile, according to the liquid filtration apparatus of the fifth invention (invention described in claim 5), the top face of the liquid filter is pressed with the aid of elastic force of the individual spacers against the plate-like seal arranged on the lower face of the top plate, so that the liquid filtration apparatus can effectively prevent the liquid, coming into the filter case, from leaking to the outside through the openings of the side panels that compose the filter case, without being filtered through the liquid filter.

DESCRIPTION OF EMBODIMENTS

A liquid filtration apparatus according to a best mode for carrying out this invention will be explained below, referring to the attached drawings.

Figure 1:
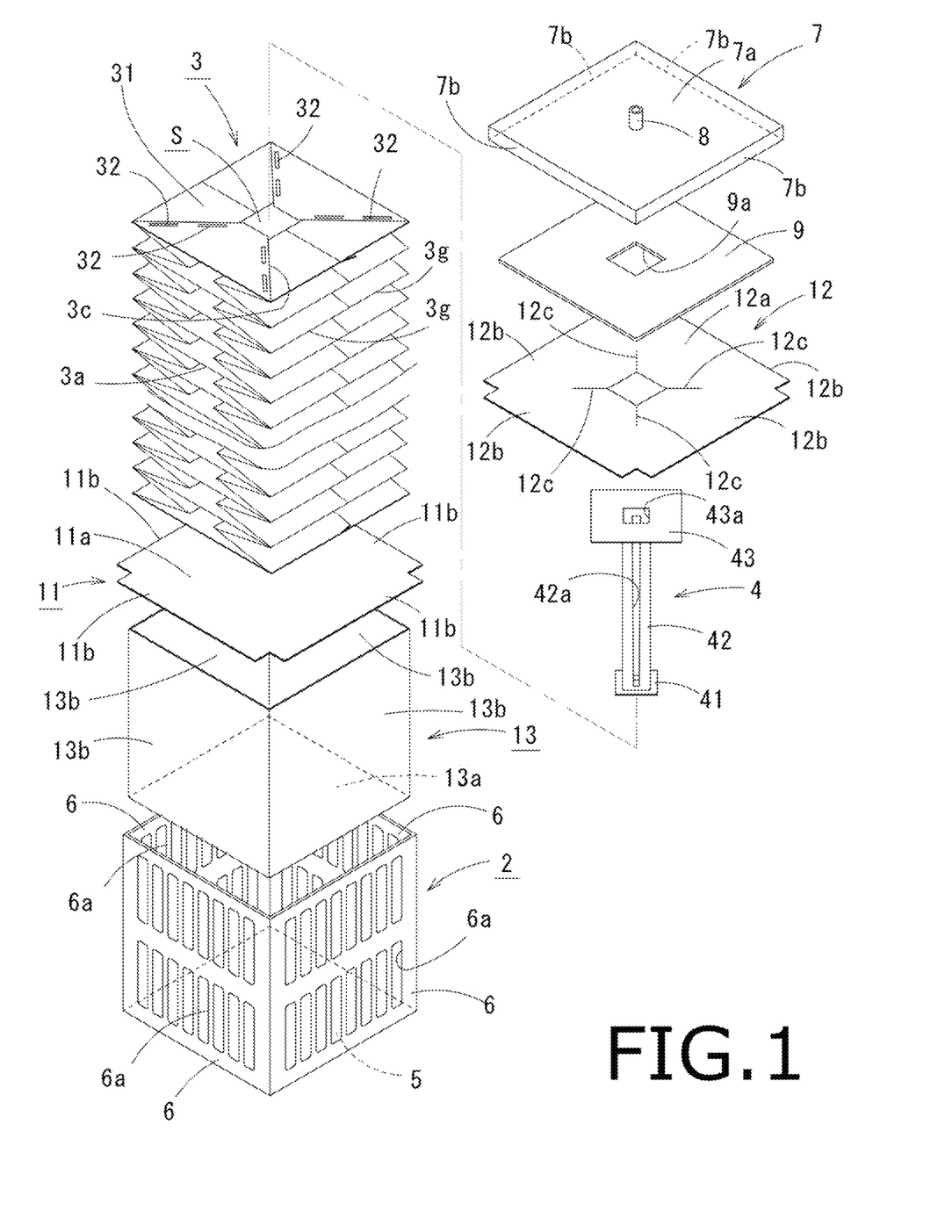
FIG. 1 is an exploded perspective view illustrating a liquid filtration apparatus.

A liquid filtration apparatus 1 of this embodiment has, as illustrated in FIG. 1, filter case (reference sign not shown) 2, a liquid filter 3 housed in the filter case 2, and a support member 4 arranged inside the liquid filter 3. The explanation begins with the filter case 2, followed by detailing the liquid filter 3.

The filter case 2 has, as illustrated in FIG. 1, a bottom plate 5, four side panels 6, and a lid 7, and has inside thereof a housing space in which the liquid filter 3 is housed. The bottom plate 5 is formed into a near-square planar shape, and each side panel 6 stands upright from each end of the upper face of the bottom plate 5. Each side panel 6 has formed therein a plurality of drain openings 6a through which a liquid after filtered through the liquid filter 3 is discharged. The lid 7 has a square-shaped flat plate 7a and four suspended plates 7b that individually suspend from the individual ends of the flat plate 7a. The upper flat plate 7a has formed at the center thereof an unillustrated circular opening, and a liquid inflow tube 8 is fixed to the opening. The upper end of the liquid inflow tube 8 protrudes out from the upper face of the flat plate 7a. Note that the upper end of the liquid inflow tube 8 is a part to which an end of a tube body, such as an unillustrated tube for feeding the liquid to be filtered into the liquid filtration apparatus 1, is connected. The flat plate 7a that composes the lid 7 also has, adhered on the back face thereof, a square-shaped seal 9 that is made of rubber or flexible resin, and has an opening 9a formed at the center.

Figure 2A:
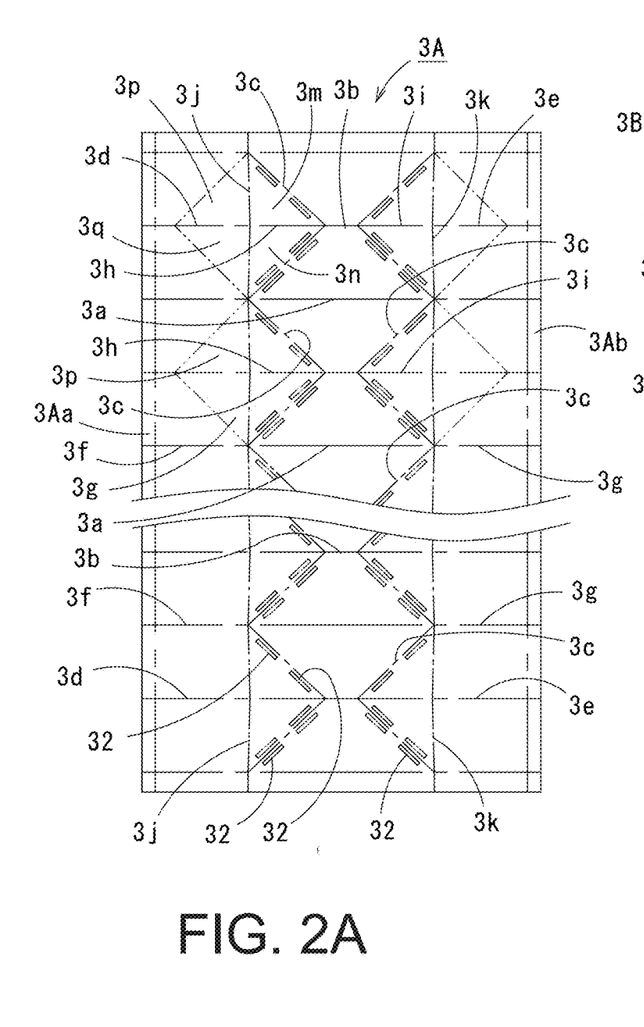
FIGS. 2A and 2B illustrate nets of one and the other filter halves that constitute a filter body.
Figure 2B:
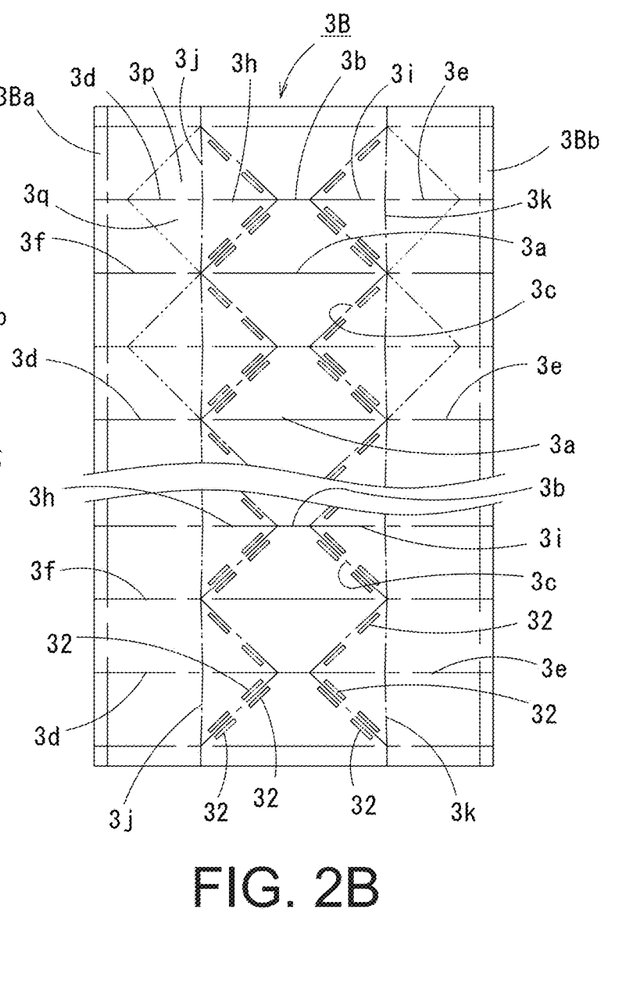
Figure 5:
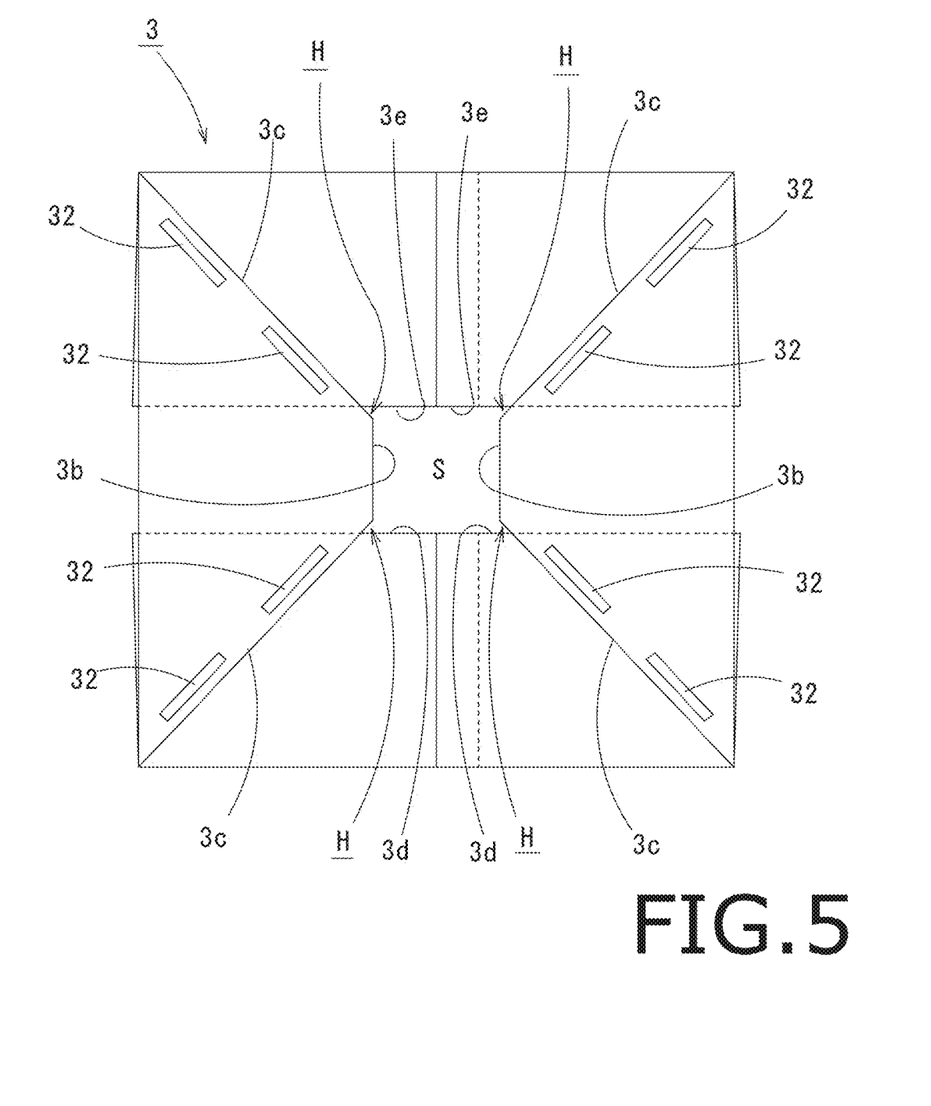
FIG. 5 is a plan view illustrating the liquid filter.

Next, the liquid filter 3 that is housed in the filter case 1 structured as described above will be explained. In this embodiment, the liquid filter 3 has a filter body 31 (filter paper), and a plurality of spacers 32 fixed to the filter body 31. The filter body 31 is a filter paper (nonwoven fabric) made of a synthetic fiber such as acrylic fiber or polyester fiber, which is water-permeable, aimed at trapping any foreign matter contained in the liquid, and is formed as a whole into near-cuboidal shape, as illustrated in FIG. 1. The filter body 31 is also formed into a near-square outer shape in a plan view, as illustrated in FIG. 5. The filter body 31 is built up as illustrated in FIG. 1, by folding rectangular filter papers individually illustrated in FIG. 2A and FIG. 2B, so as to individually form mountain fold parts, valley fold parts, diagonal fold parts and so forth described later, and then by welding the thus folded one and the other filter halves 3A, 3B mutually at the ends. Note that the one and the other filter halves 3A, 3B individually illustrated in FIGS. 2A and 2B represent the inner side faces of the one and the other filter halves 3A, 3B, respectively. That is, FIG. 2A is a net of the filter paper to be built up to the one filter half 3A, and FIG. 2B is a net of the filter paper to be built up to the other filter half 3B. In these nets, the one filter half 3A has welding tabs 3Aa, 3Ab formed at both of left and right ends in the longitudinal direction, meanwhile the other filter half 3B has, formed on the left end in the longitudinal direction, a welding tab 3Ba to be welded to the welding tab 3Ab, and, the other filter half 3B has, formed on the right end in the longitudinal direction, a welding tab 3Bb to be welded to the welding tab 3Aa.

Figure 3:
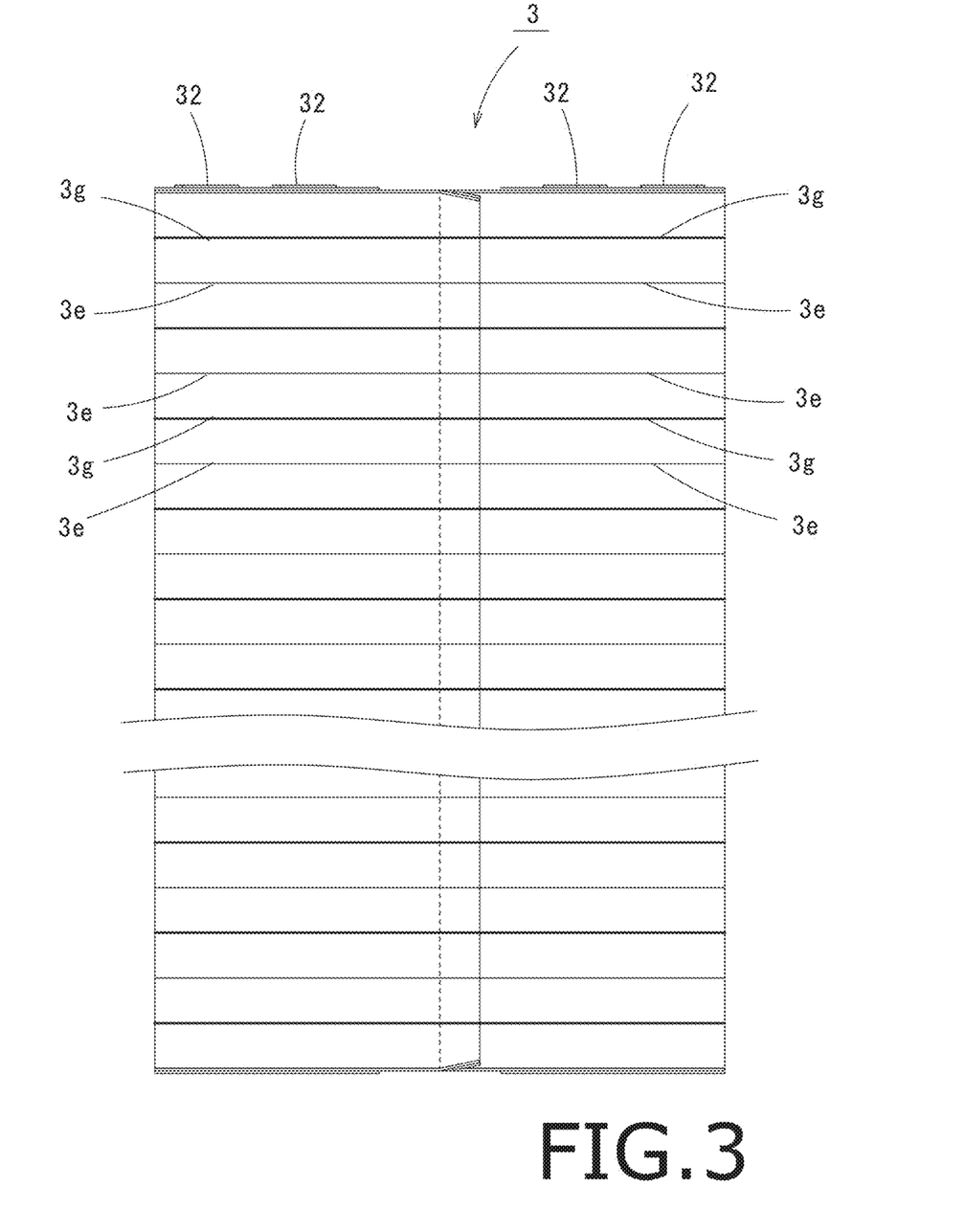
FIG. 3 is a front elevation illustrating the filter body in a stretched state.

In the one and the other filter halves 3A, 3B illustrated in FIGS. 2A and 2B, the individual parts indicated by reference sign 3a represent long mountain fold parts that expose towards the left side face or the right side face, and the individual parts indicated by reference sign 3b that fall between reference signs 3a, 3a represent short valley fold parts which are opposed inside the liquid filter 3, as illustrated in FIG. 5 as the plan view of the liquid filter 3. Note that the individual short valley fold parts 3b correspond to the one valley fold parts that compose this invention. On the other hand, the individual parts indicated by reference sign 3c represent the diagonal fold parts which are formed radially around the center of the liquid filter 3 as illustrated in FIG. 5. That is, the individual diagonal fold parts 3c are formed, as illustrated in FIG. 1, outwards from the corner parts of the later-described liquid inflow space S, and has a length in the radial direction around the center of the liquid inflow space S. In the one and the other filter halves 3A, 3B illustrated in FIGS. 2A and 2B, reference signs 3d, 3e represent the long valley fold parts longer than the short valley fold parts 3b. Above and below these long valley fold parts 3d, 3e, arranged are long mountain fold parts 3f, 3g that expose to the front face or the back face of the liquid filter 3, as illustrated in FIG. 1 or FIG. 3. A part of each of the long valley fold parts 3d, 3e is positioned so as to expose, as illustrated in FIG. 5 as the plan view of the liquid filter 3, to the inside of the liquid inflow space S formed at the center of the liquid filter 3, and the individual long valley fold parts 3d, 3e correspond to the other valley fold parts that compose this invention.

Figure 4:
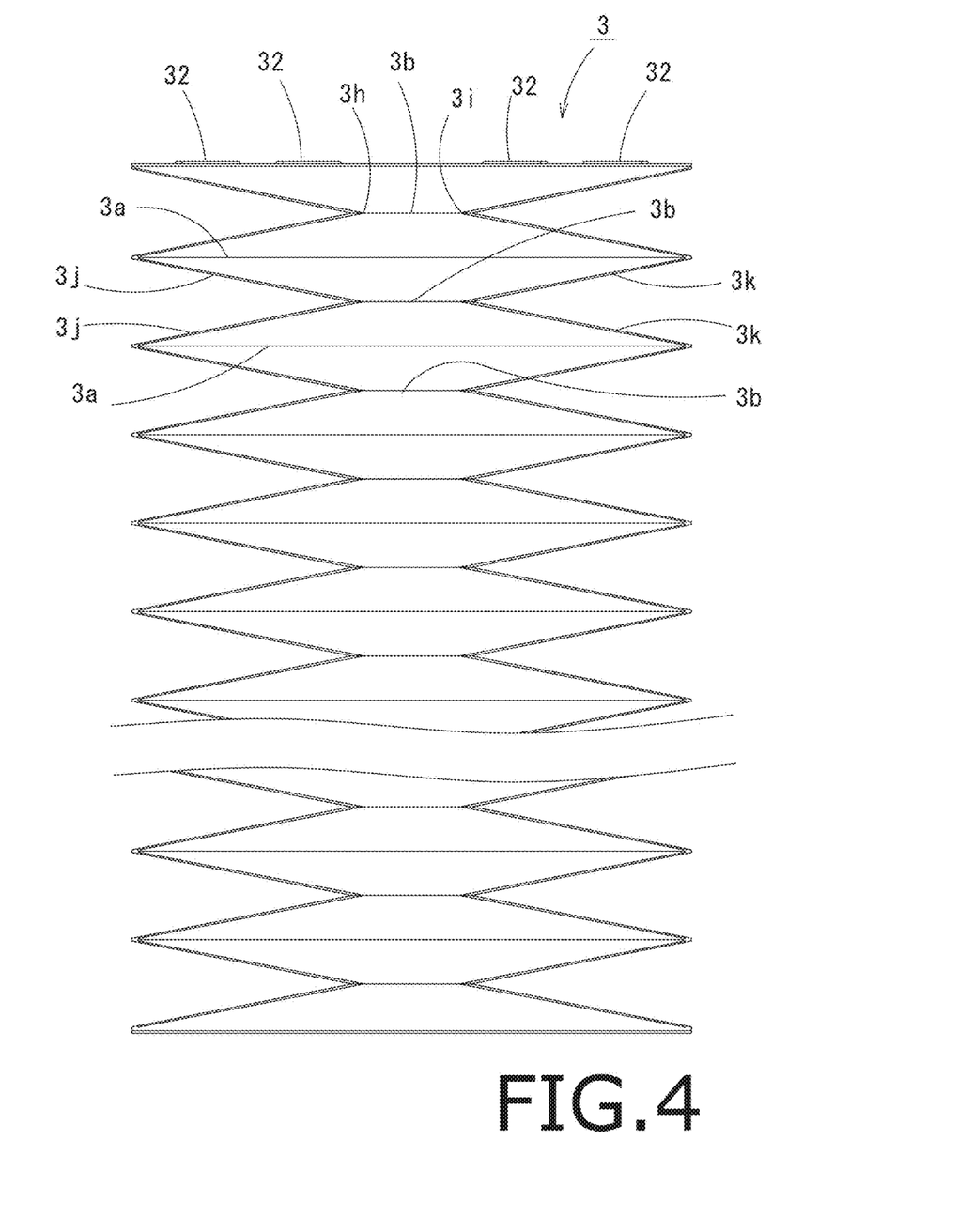
FIG. 4 is a side elevation illustrating the filter body in a stretched state.

Between each of the individual short valley fold parts 3b and the long valley fold parts 3d, 3e in the one and the other filter halves 3A, 3B illustrated in FIG. 2, formed are short mountain fold parts 3h, 3i that are folded in the direction opposite to the short valley fold part 3b and the long valley fold parts 3d, 3e. These short mountain fold parts 3h, 3i individually have a length in the direction orthogonal to the long mountain fold part 3a. Between each long valley fold part 3d and each short mountain fold part 3h, there is formed a left long mountain fold part 3j that has a length in the longitudinal direction of the one and the other filter halves 3A, 3B, meanwhile between each long valley fold part 3e and each short mountain fold part 3i, there is formed a right long mountain fold part 3k that has a length in the longitudinal direction of the one and the other filter halves 3A, 3B, which are in parallel to each other. The left long mountain fold part 3*j* forms, as illustrated in FIG. 4, a part exposed so as to shrink rightwards, meanwhile the right long mountain fold part 3*k* forms a part exposed so as to shrink leftwards, on the left side face or the right side face of the liquid filter 3.

The liquid filter 3 built up by folding the aforementioned one and the other filter halves 3A, 3B and welding them to each other has, as illustrated in FIGS. 2A and 2B, triangular filtering areas 3*m*, 3*n* that are surrounded by three sides, which are diagonal fold part 3*c*; a part of the long valley fold part 3*d* near the short mountain fold part 3*h*, or a part of the long valley fold part 3*e* near the short mountain fold part 3*i*; and the left long mountain fold part 3*j* or the right long mountain fold part 3*j*. These triangular filtering areas 3*m*, 3*n* are respectively opposed to triangular filtering areas 3*p*, 3*q* that are surrounded by three sides, which are the long valley fold parts 3*d*, 3*e*; the left long mountain fold part 3*j* or the right long mountain fold part 3*k*; the long mountain fold parts 3*f*, 3*g*; and two-dot chain line illustrated in FIGS. 2A and 2B, whereby the filtering areas 3*m*, 3*n* and filtering areas 3*p*, 3*q* are opposed to each other, and form pocket parts 3*r*, 3*s* that are closed by the short mountain fold part 3*h* and the short mountain fold part 3*i* (or left long mountain fold part 3*j* or the right long mountain fold part 3*k*). Four in total of such pocket parts similar to the pocket parts 3*r*, 3*s* are formed while bounded by four diagonal fold parts 3*c*, in a plan view of the liquid filter 3. In other words, each of the pocket parts including the pocket parts 3*r*, 3*s* is, as illustrated in FIG. 6, a triangular area in a plan view having any one of the diagonal fold parts 3*c* as one side.

The liquid filter 3, which is built up by folding the one and the other filter halves 3A, 3B as described above and by welding them to each other, has formed at the center and in the height direction thereof, a liquid inflow space S into which the liquid to be filtered is fed through the liquid inflow tube 8 connected to a tube body such as an unillustrated tube or the like. The liquid inflow space S is a space formed by center parts of the mutually opposed long valley fold parts 3*d*, 3*e*, and the mutually opposed short valley fold parts 3*b*.

Figure 6:
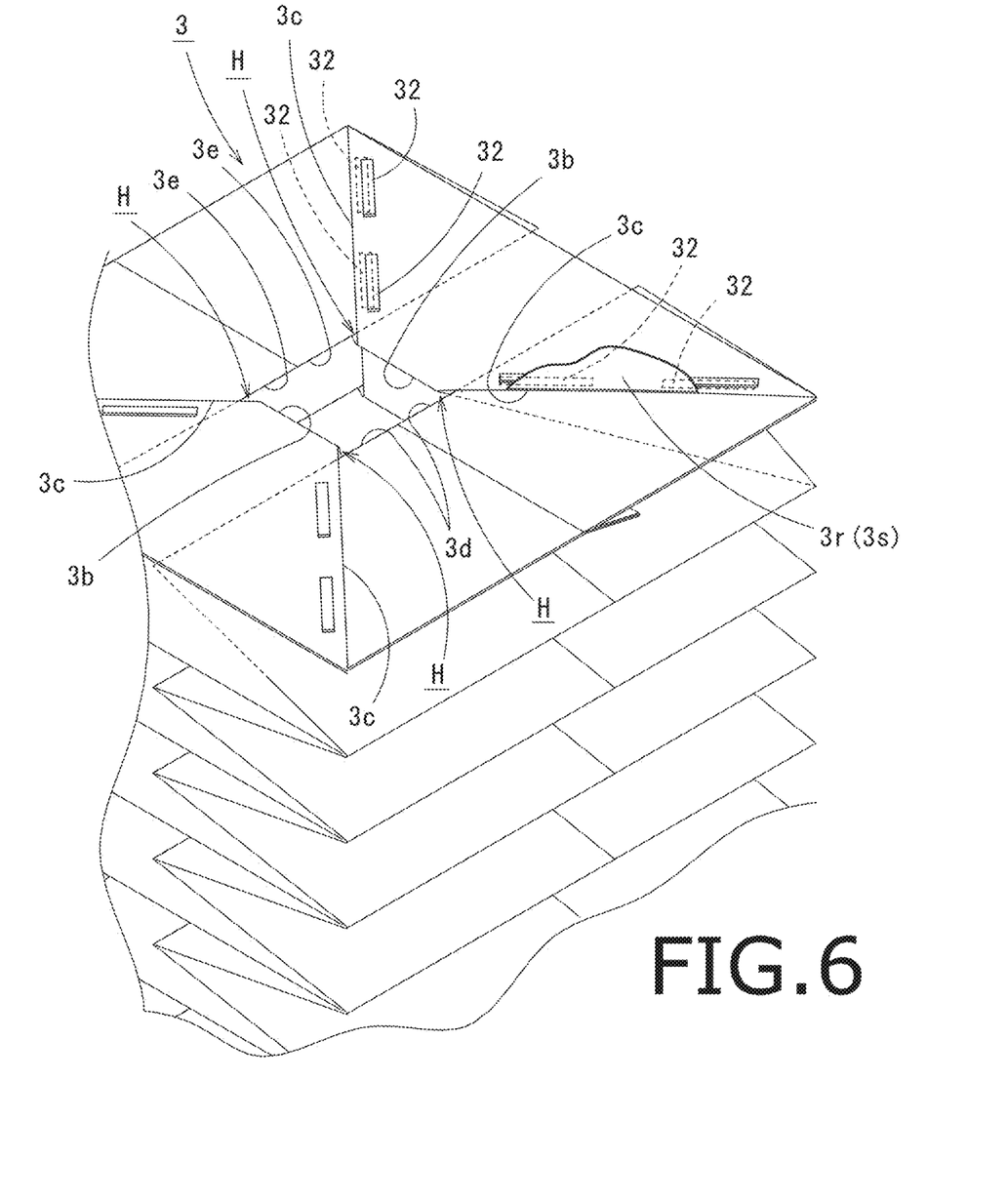
FIG. 6 is a perspective view illustrating inlet ports and triangular pocket parts.

In the liquid filter 3 of this embodiment as illustrated in FIG. 6, the length of the mutually opposed short valley fold parts 3*b*, 3*b* in a plan view is shorter than the parts of the long valley fold parts 3*d*, 3*e* that expose to the liquid inflow space S. Both on the left and right sides of the short valley fold part 3*b*, 3*b*, and apart from the long valley fold parts 3*d*, 3*e*, there are provided inlet ports H through which the liquid flows in the directions of the individual pocket parts including the pocket parts 3*r*, 3*s*. That is, four inlet ports H are formed on the same plane of the liquid filter 3.

The liquid filter 3 of this embodiment, as illustrated in FIG. 6, has a plurality of spacers 32 that prevent the mutually opposed filtering areas 3*m*, 3*n* from overlapping with the filtering areas 3*p*, 3*q* so as to keep a predetermined distance among them, which are fixed near the individual diagonal fold parts 3*c* that correspond to inlet ports of the individual pocket parts including the pocket parts 3*m*, 3*n*. FIG. 2 is a net illustrating a layout of these spacers 32. The spacers 32 are formed of an elastic and flexible material such as urethane resin into a rectangular shape, and are fixed by twos while keeping a predetermined distance in between, for each of the triangular filtering areas 3*m*, 3*n*. Each spacer 32 is formed to a length shorter than the half length of the diagonal fold part 3*c*, with a thickness of approximately 0.5 to 1.5 mm, and is fixed in parallel to the diagonal fold part 3*c*. The individual spacers 32 are fixed at the same position (in the height direction of the liquid filter 3) in a plan view of the liquid filter 3.

The liquid filtration apparatus 1 of this embodiment also has the support member 4 as a constituent. The support member 4 has, as illustrated in FIG. 1, a bottom plate 41, a pipe-like support body 42 that stands upright from the bottom plate 41, and a top plate 43 that is fixed to the top end of the support body 42, with the lower face opposed to the bottom plate 41. The bottom plate 41 is formed into a square shape, which is slightly smaller than the shape of the liquid inflow space formed at the center of the liquid filter 3 (near-similar shape). The support body 42 is formed into a hollow shape, has an outer shape in a plan view slightly smaller than the outer shape of the bottom plate 41 (near-similar shape), has four side faces formed into the same shape, and each side face has formed therein an opening 42*a* having a length in the direction same as the longitudinal direction of the support body 42. The top plate 43 is formed into a shape larger than the shape of the bottom plate 41 in a plan view (near-similar shape), and has formed in the center thereof an opening 43*a* through which the liquid to be filtered flows.

The liquid filtration apparatus 1 of this embodiment has, as illustrated in FIG. 1, a lower sheet 11 arranged below the liquid filter 3, and an upper sheet 12 arranged above the liquid filter 3. The lower sheet 11, the liquid filter 3 and the upper sheet 12 are housed in a top-opened bag 13, and further housed in the filter case 2. Both of the lower sheet 11 and the upper sheet 12 are made of the same filter paper as the liquid filter 3, whereas the bag 13 is made of a filter paper slightly coarser than the liquid filter 3 (filter body 31). The lower sheet 11 has a near-square principal face 11*a* that is formed into a shape same as the outer shape of the bottom face of the liquid filter 3, and four folding tabs 11*b* that extend outwards from the individual sides of the principal face 11*a*, and are folded along the long mountain fold parts 3*a*, 3*f*, 3*g* positioned lowermost in the liquid filter 3 so as to embrace the liquid filter 3. The upper sheet 12 has a near-square principal face 12*a* that is formed into a shape same as the outer shape of the top face of the liquid filter 3, and four folding tabs 12*b* that extend outwards from the individual sides of the principal face 12*a*, and are folded along the long mountain fold parts 3*a*, 3*f*, 3*g* positioned uppermost in the liquid filter 3 so as to embrace the liquid filter 3. The principal face 12*a* has, formed at the center thereof, a rectangular opening 12*c* which is the slightly larger than the opening 43*a* formed in the top plate 43 of the support member 4, and slits 12*d* formed so as to individually extend outwards from four corner parts of the rectangular opening 12*c*. The bag 13 has, as illustrated in FIG. 1, a near square-shaped bottom plate 13*a*, and four side panels 13*b* that stands upright from the individual sides, and has an opened top.

An exemplary method for assembling the aforementioned liquid filtration apparatus 1 will be briefed below. First, the lower sheet 11 is placed below the liquid filter 3, and four folding tabs 11*b* are folded along the long mountain fold parts 3*a*, 3*f*, 3*g* to embrace the liquid filter 3*e*, whereby the lower sheet 11 is integrated with the liquid filter 3. On the other hand, the upper sheet 12 is placed above the liquid filter 3, and four folding tabs 12*b* are folded to be integrated with the liquid filter 3. Next, the liquid filter 3, the lower sheet 11 and the upper sheet 12 thus arranged are housed en bloc in the bag 13, and the bag 13 is further housed in the filter case 2. The inner face of the upper sheet 12 is then turned up along four slits 12*c* formed in the upper sheet 12, the support member 4 is inserted from above, and after insertion, the support member 4 is turned 90 degrees, the turned up parts are returned to the original position, the lid 7 is placed so as to close the opening formed by the four side panels 6, and such closed state is kept by using a predetermined closure keeping means. Note that the closure keeping means may be embodied by a structure for fixing the side panels 6 and the lid 7 with use of an unillustrated catch clip, or by a structure for winding a plurality of unillustrated belts around the entire body of the filter case 2, and fastening them with use of predetermined buckles.

Hence in the aforementioned liquid filtration apparatus 1, the liquid to be filtered is fed from a tube body, such as an unillustrated tube, through the liquid inflow tube 8 into the support body 42, flows through the opening 42a formed in the support body 42 into the liquid inflow space formed in the liquid filter 3, passes through the filter body 31 and the bag 13 which are made of filter papers, and is discharged through the plurality of drain openings 6a that are formed in the four side panels 6 composing the filter case 2, to the outside of the liquid filtration apparatus 1. In this process, since the filter body 31 that composes the liquid filter 3 has fixed thereto the aforementioned plurality of spacers 32, so that the liquid can effectively flow into the thus-closed pocket parts 3r, 3s, and can be uniformly filtered over the entire range of the filter body 31, thus enabling long-term use. In particular, in the liquid filtration apparatus 1 of this embodiment, since the spacers 32 that are not only fixed to the same position in a plan view of the filter body 31, but also made of an elastic material, so that the fixed spacers 32 may be compressed en bloc. With the lid 7 held by the predetermined closure keeping means in such compressed state, the top face of the liquid filter 3 and the top face of the principal face 12a of the upper sheet 12 can be pressed against the lower face of the seal 9, whereby a risk of leakage of unfiltered liquid to the outside becomes effectively avoidable.

REFERENCE SIGNS LIST 1 liquid filtration apparatus
2 filter case
3 liquid filter
3a long mountain fold part
3b short valley fold part
3c diagonal fold part
3d, 3e long valley fold part
3h, 3i short mountain fold part
3j left long mountain fold part
3k right long mountain fold part
3r, 3s pocket part
4 support member
5 bottom plate
6 side panel
6a drain opening
7 lid
31 filter body (filter paper)
32 spacer
S liquid inflow space

The invention claimed is:

1. A liquid filter comprising:
a filter body comprising a filter paper through which a liquid is allowed to pass from an inner face to an outer face, and
a plurality of spacers fixed to the filter body,
the filter body further comprising:
a liquid inflow space defined at a center of the filter body having corner parts, the liquid inflow space having four sides connected to one another at four corners, and inlet ports defined at each corner so as to define a near-cuboidal shape of the liquid inflow space,
mountain fold parts individually exposed to an outside of a front face and a back face, as well as of a left side face and a right side face, individually having a length in the direction orthogonal to a height direction, and juxtaposed in the height direction;
valley fold parts individually formed between adjacent ones of the mountain fold parts, partially contributing to form the liquid inflow space, and having each of the valley fold parts having a length equal to or shorter than a length of the mountain fold parts;
diagonal fold parts individually formed outwards from the corners of the liquid inflow space, and having a length in a radial direction around a center of the liquid inflow space; and
pocket parts, each pocket part having a respective one of the diagonal fold parts on one side, and having a triangular planar shape,
each spacer being fixed on the inner face of the filter paper, near a respective one of the diagonal fold parts, and inside of each of the pocket parts.

2. The liquid filter according to claim 1, wherein the plurality of spacers are individually arranged in parallel to a longitudinal direction of the diagonal fold parts and on a same plane of the filter body, such that when folded, a channel space is defined between respective layers of the filter body through which the liquid flows.

3. The liquid filter according to claim 1, wherein the left and right ends of a first group of the valley fold parts that are formed between the adjacent ones of the mountain fold parts that are exposed to the left side face or the right side face are faced towards the liquid inflow space, are spaced with respect to each other, in a plan view of the liquid filter, from a second group of the valley fold parts that are formed between the adjacent ones of the mountain fold parts that are exposed to the front face or the back face and are faced towards the liquid inflow space, and are spaced from a third group of the valley fold parts that are formed between the adjacent ones of the mountain fold parts that are exposed to the back face and are faced towards the liquid inflow space; and
each of the first group of the valley fold parts comprise an inlet port defined at the left and right ends through which the liquid to be filtered enters the pocket parts.

4. A liquid filtration apparatus comprising:
a filter case that comprises a bottom plate formed into a rectangular shape;
a side panel that rises up from each side of the bottom plate, and has formed therein a plurality of openings through which a liquid flows towards the outside; and
a top plate comprising a tube body fixed to a center position of the top plate through which the liquid enters and extending from the top plate in a direction opposite to the bottom plate, the top plate being disposed on the side panel so as to be opposite from the bottom plate; and
the liquid filter described in claim 1, housed in the filter case.

5. The liquid filtration apparatus according to claim 4, wherein the top plate has a plate-like seal arranged on a lower face of the top plate, and each of the spacers comprise an elastic material and are arranged at a same position on individual layers of the filter body in a plan view of the liquid filter.

* * * * *